(12) United States Patent
Yang

(10) Patent No.: US 10,052,802 B2
(45) Date of Patent: Aug. 21, 2018

(54) ELECTRICAL MOLD CLAMPING APPARATUS OF PLASTIC INJECTION MOLDING MACHINES

(71) Applicant: HWA CHIN MACHINERY FACTORY CO., LTD., Tainan (TW)

(72) Inventor: Ching Kun Yang, Tainan (TW)

(73) Assignee: Hwa Chin Machinery Factory Co., Ltd., Tainan (TW)

( * ) Notice: Subject to any disclaimer, the term of this patent is extended or adjusted under 35 U.S.C. 154(b) by 388 days.

(21) Appl. No.: 14/887,486

(22) Filed: Oct. 20, 2015

(65) Prior Publication Data
US 2017/0106576 A1 Apr. 20, 2017

(51) Int. Cl.
B29C 45/66 (2006.01)
B29C 45/40 (2006.01)
B29C 45/83 (2006.01)
B29C 45/17 (2006.01)

(52) U.S. Cl.
CPC .......... B29C 45/661 (2013.01); B29C 45/401 (2013.01); B29C 45/83 (2013.01); B29C 2045/1792 (2013.01); B29C 2045/835 (2013.01)

(58) Field of Classification Search
CPC ................ B29C 45/401; B29C 45/661; B29C 2045/1792; B29C 2045/835
See application file for complete search history.

(56) References Cited

U.S. PATENT DOCUMENTS

| | | | | |
|---|---|---|---|---|
| 5,178,888 A | * | 1/1993 | Wurl | B29C 45/661 425/451.5 |
| 5,804,224 A | * | 9/1998 | Inaba | B29C 45/1777 425/150 |
| 5,843,496 A | * | 12/1998 | Ito | B29C 45/661 100/258 A |
| 6,004,490 A | * | 12/1999 | Tsai | B29C 45/661 264/328.1 |
| 6,478,571 B1 | * | 11/2002 | Tsai | B29C 45/4005 425/556 |
| 6,695,995 B1 | * | 2/2004 | Suzuki | B29C 45/1751 264/328.1 |
| 6,948,925 B2 | * | 9/2005 | Fischbach | B29C 45/661 425/451.6 |
| 2003/0147989 A1 | * | 8/2003 | Kasai | B29C 45/1761 425/593 |
| 2004/0047944 A1 | * | 3/2004 | Fischbach | B29C 45/661 425/595 |

FOREIGN PATENT DOCUMENTS

DE 10 2004 042 744 * 3/2006

* cited by examiner

*Primary Examiner* — James P Mackey
(74) *Attorney, Agent, or Firm* — Rosenberg, Klein & Lee

(57) ABSTRACT

An electrical mold clamping apparatus of a plastic injection molding machines includes a motor unit mounted onto a link base for driving a gear at an end of a ball screw in the link base to rotate and a ball screw socket disposed at a fixed base, and the other end of the ball screw of the link base is screwed into the ball screw socket. When the motor unit drives the ball screw to rotate, the link base is displaced with the rotation of the ball screw to achieve the effect of reducing the load of the motor unit as well as the loss of energy.

10 Claims, 6 Drawing Sheets

ELECTRICAL MOLD CLAMPING APPARATUS OF PLASTIC INJECTION MOLDING MACHINES

TECHNICAL FIELD

The technical field relates to an electrical mold clamping apparatus of a plastic injection molding machine, in particular to a mold clamping apparatus capable of driving and operating a toggle link rod set and a movable mold base to achieve the effects of reducing load and improving strength, so as to overcome the issues of losing energy of the injection molding machine and lubricating ball screws.

BACKGROUND

In general, most conventional injection molding machines adopt a mold clamping apparatus for clamping and opening a mold. With reference to FIG. 6 for a general toggle injection molding machine as disclosed in R.O.C. Utility Model No. 522922, the toggle injection molding machine uses a toggle link rod set and a hydraulic cylinder extended outside the machine to push and move a movable mold base to perform the mold opening and clamping stroke. However, the distance of the hydraulic cylinder extended out of the aforementioned toggle injection molding machine is very large, so that it takes more space for packaging and transporting the machine and incurs higher packaging and transportation costs. In addition, the hydraulic cylinder also requires a larger space for the installation of the injection molding machine in a factory, and thus causing problems for the site planning of the factory and troubles for the installation of the injection molding machine.

With reference to FIGS. 1 to 5 for U.S. Pat. No. 6,520,766 issued to the discloser of this disclosure, the injection molding machine has a toggle link rod set pivoted between a bearing disc and a movable mold base, and the bearing disc and the movable mold base are disposed on a tie bar, and a link base is movably sheathed on the tie bar between the bearing disc and the movable mold base, and the link base is movably pivoted to a third arm of the toggle link rod set. In the meantime, a transmission member is installed on the link base, and the power source of the transmission member drives a threaded socket in the link base to rotate, and a ball screw is screwed into the threaded socket, and the front end of the ball screw is fixed to the backside of the movable mold base, so that when the power source drives the threaded socket to rotate, the threaded socket is moved on the ball screw to drive the link base to displace, so as to drive the toggle link rod set to push the movable mold base to perform the stroke of clamping and opening a mold and the transmission mechanism for driving the operation of the toggle link rod set and the movable mold base is installed in the machine. Therefore, the assembling space and the packaging and transportation costs can be saved.

In the actual manufacturing process, the discloser finds out that the mold clamping apparatus of the injection molding machine has the following drawbacks:

1. The threaded socket of the aforementioned patent requires a lubricating oil filled into the threaded socket in order to drive the ball screw to move, but the threaded socket has to rotate, so that an oil filling hole cannot be formed on the threaded socket, and an oil supply hole is formed at the center of the ball screw and communicated with the threaded socket for filling the lubricating oil. Obviously, such conventional molding machine is inconvenient.

2. The ball screw of the aforementioned patent must be a hollow rod, but the hollow rod not just reduces the structural strength of the ball screw only, but also shortens the service life and increases the manufacturing cost of the machine.

3. The first end of the ball screw of the aforementioned patent is connected to the center of the movable mold base, so that the mold ejector pins of the movable mold base must be installed on both sides of the stationary mold base, and thus increasing cost.

4. When the threaded socket is moved on the ball screw in accordance with the aforementioned patent, larger threaded socket and bearing are required, and the load of the motor for driving and rotating the threaded socket, and thus increasing the loss of electric power.

SUMMARY

In view of the aforementioned drawbacks of the prior art, the discloser of this disclosure based on years of experience in the related industry to conduct extensive researches and experiments, and finally designed an electrical mold clamping apparatus of a plastic injection molding machine to overcome the drawbacks of the prior art.

Therefore, it is a primary objective of this disclosure to provide an electrical mold clamping apparatus of a plastic injection molding machines, and the electrical mold clamping apparatus has a plurality of tie bars disposed on the plastic injection machine, and each of the tie bars has a fixed base, a link base, a movable mold base and a stationary mold base, and a first link rod seat is disposed on an end surface of the fixed base, and a through hole is formed at the center of the fixed base, and a second link rod seat is disposed on an end surface of the movable mold base, and the electrical mold clamping apparatus comprises: a first motor unit, installed to a side portion of the link base, and coupled to a first driving gear; a ball screw socket, having an inner hole configured to be corresponsive to a through hole of the fixed base; a hollow shaft seat, disposed at the center of the link base; a ball screw, having a first end screwed into the inner hole of the ball screw socket and a second end passed into the hollow shaft seat; a first driven gear, coupled to the second end of the ball screw, and first driving belt looped between the first driven gear and the first driving gear; and at least two sets of corresponsive link rod units, each including a first link rod, a second link rod and a third link rod, and a first end of the first link rod being pivotally coupled to a first link rod seat of the fixed base, and a first end of the second link rod being pivotally coupled to a second link rod seat of the movable mold base, and a second end of the first link rod being pivotally coupled to a second end of the second link rod, and a first end of the third link rod being pivotally coupled to the link base, and a second end of the third link rod being pivotally coupled to a third end of the first link rod.

Preferably, the ball screw socket has an oil supply hole.

Preferably, the movable mold base further includes a second motor unit having a second driving gear, an ejector pin having a second driven gear, and a second driving belt looped between the second driving gear and the second driven gear.

Preferably, the second motor unit is installed to a unilateral portion of an end surface of the movable mold base.

Preferably, the ejector pin is installed at the center of an end surface of the movable mold base.

With the aforementioned technical characteristics, the electrical mold clamping apparatus of this disclosure has the effects of increasing the structural strength of the ball screw, reducing the load of the first motor unit, improving the lubrication of the ball screw and the threaded socket, enhancing the service life of components and saving energy.

DESCRIPTION OF THE PREFERRED EMBODIMENTS

Figure 1:
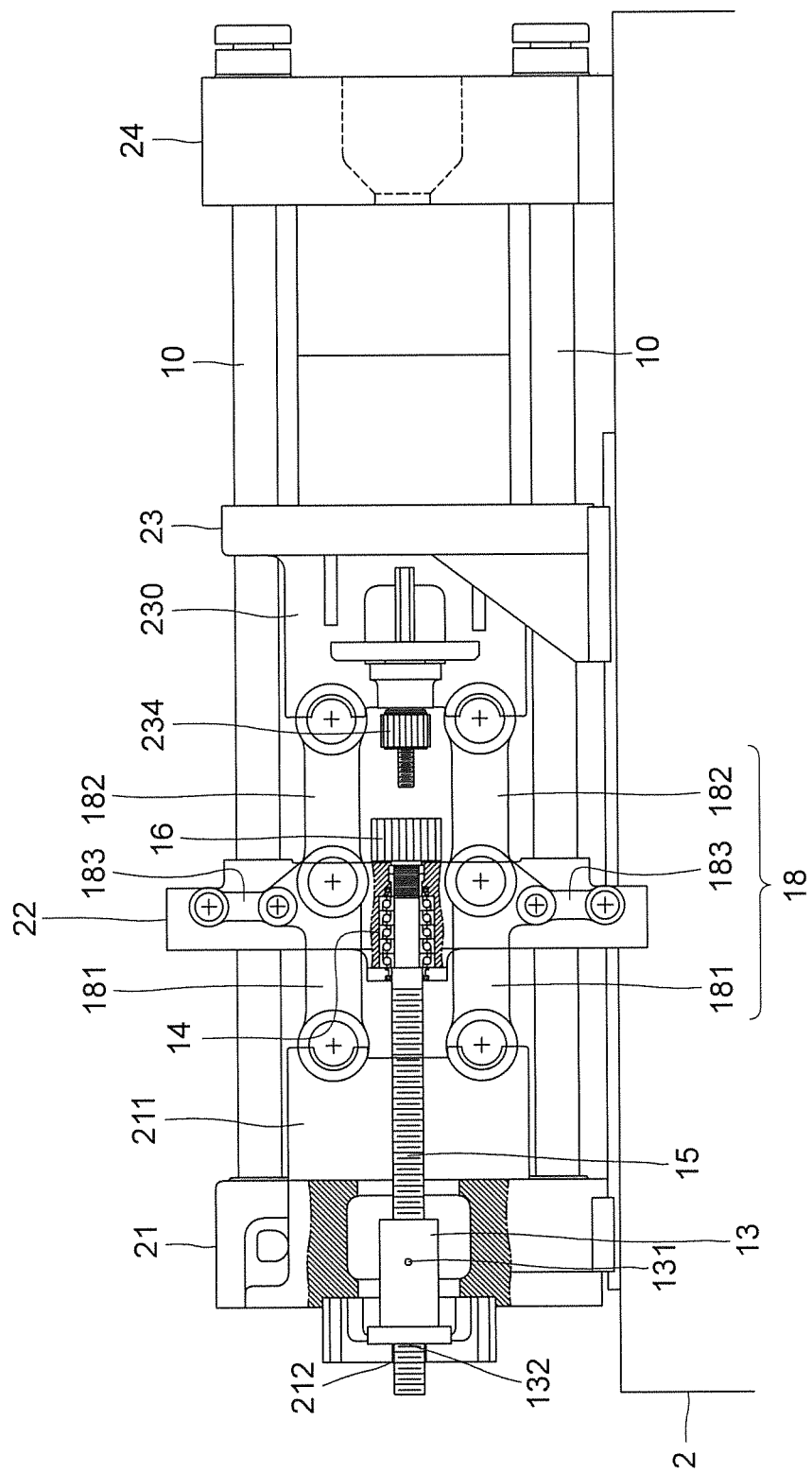
FIG. 1 is a front view of an electrical mold clamping apparatus of this disclosure before clamping.

This disclosure will become clearer in light of the following detailed description of an illustrative embodiment described in connection with the drawings. It is intended that the embodiments and drawings disclosed herein are to be considered illustrative rather than restrictive.

With reference to FIGS. 1 to 4, the plastic injection machine comprises a plurality of tie bars 10 disposed on a platform 2 of the plastic injection machine, and the tie bar 10 includes a fixed base 21, a link base 22, a movable mold base 23 and a stationary mold base 24, wherein a first link rod seat 211 is disposed on an end surface of the fixed base 21, and a through hole 212 is formed at the center position of the fixed base 21; a second link rod seat 230 is disposed on an end surface of the movable mold base 23, and the electrical mold clamping apparatus 1 comprises a first motor unit 11, a first driving gear 12, a ball screw socket 13, a hollow shaft seat 14, a ball screw 15, a first driven gear 16 and at least two corresponsive link rod units 18.

The first motor unit 11 is installed at a lateral portion of the link base 22, and the first motor unit 11 is coupled to the first driving gear 12. The inner hole 132 of the ball screw socket 13 is configured to be corresponsive to the through hole 212 of the fixed base 21, and an oil supply hole 131 is further provided. The hollow shaft seat 14 is disposed at the center of the link base 22. The ball screw 15 has a first end screwed into the inner hole 132 of the ball screw socket 13 and a second end pivoted to the interior of the hollow shaft seat 14. The first driven gear 16 is coupled to the second end of the ball screw 15, and a first driving belt 17 is looped between the first driven gear 16 and the first driving gear 12. The link rod unit 18 includes a first link rod 181, a second link rod 182 and a third link rod 183, wherein the first link rod 181 has a first end pivotally coupled to the first link rod seat 211 of the fixed base 21, and the second link rod 182 has a first end pivotally coupled to the second link rod seat 230 of the movable mold base 23, and the second end of the first link rod 181 is pivotally coupled to the second end of the second link rod 182, and the first end of the third link rod 183 is pivotally coupled to the link base 22, and the second end of the third link rod 183 is pivotally coupled to the third end of the first link rod 181.

The movable mold base 23 further includes a second motor unit 231, an ejector pin 233 and a second driving belt 235, wherein the second motor unit 231 is installed at a unilateral portion on the end surface of the movable mold base 23 and has a second driving gear 232; the ejector pin 233 is installed at the center on the end surface of the movable mold base 23 and has a second driven gear 234; and the second driving belt 235 is looped between the second driving gear 232 and the second driven gear 234.

Figure 2:
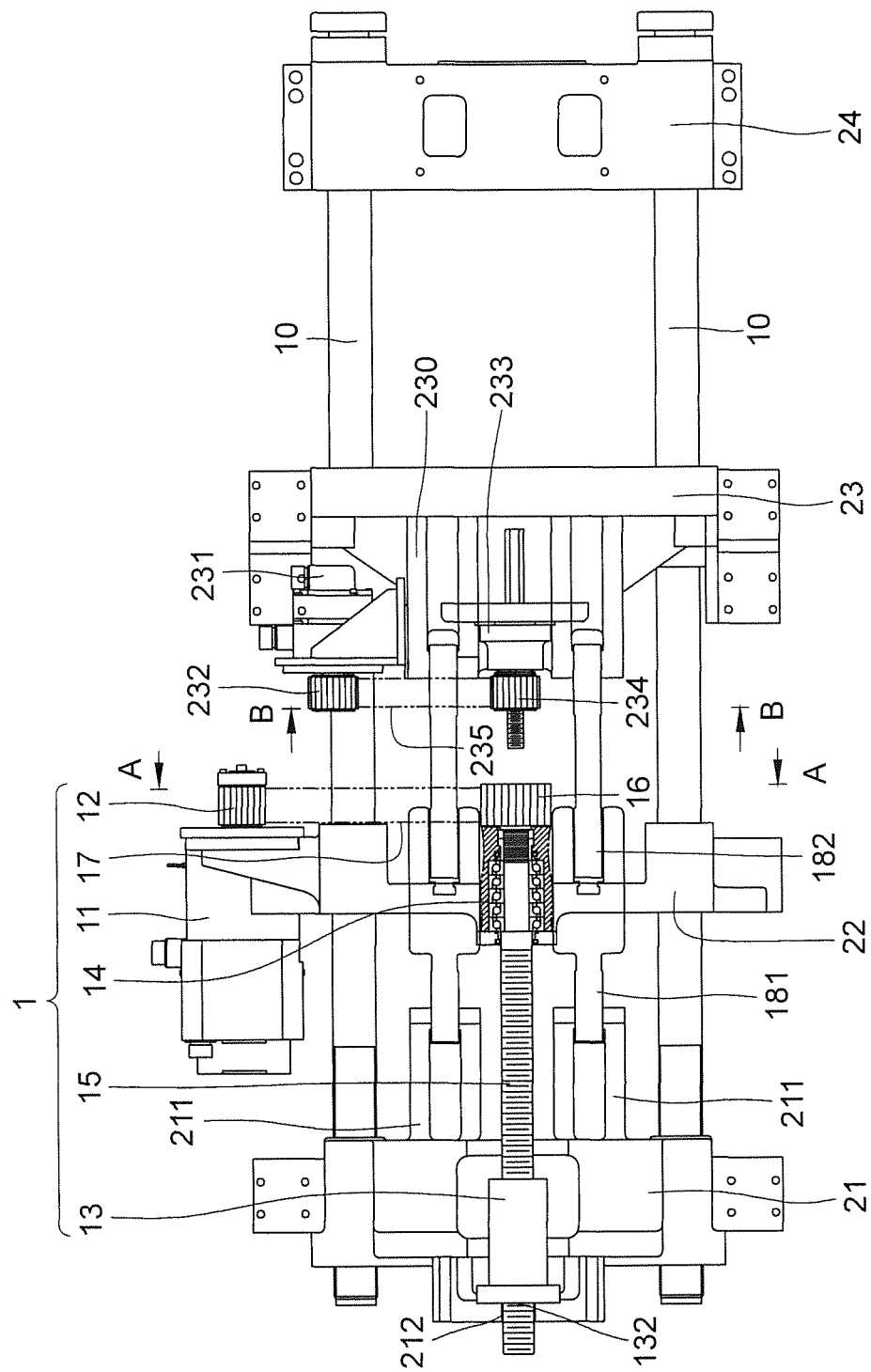
FIG. 2 is a top view of clamping an electrical mold clamping apparatus of this disclosure.
Figure 3:
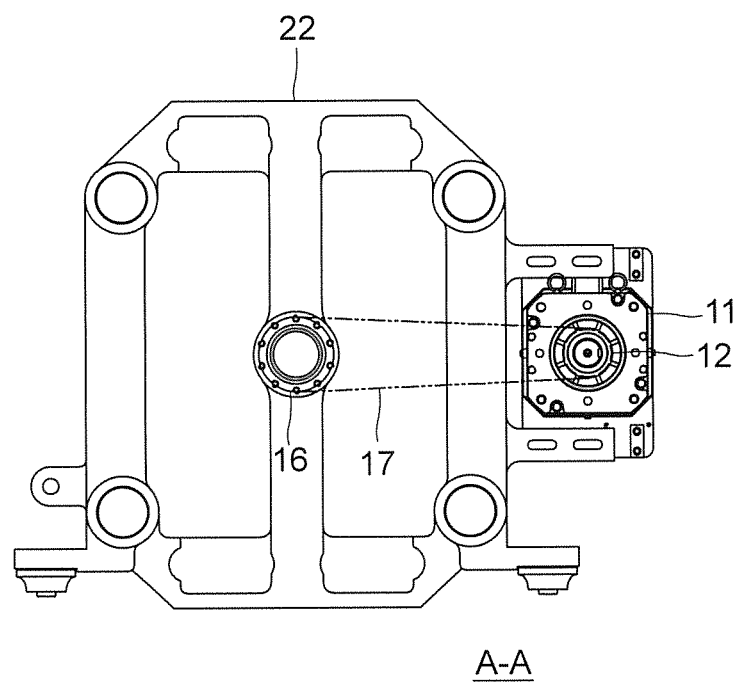
FIG. 3 is a sectional view of Section A-A of the electrical mold clamping apparatus of this disclosure as depicted in FIG. 2.
Figure 4:
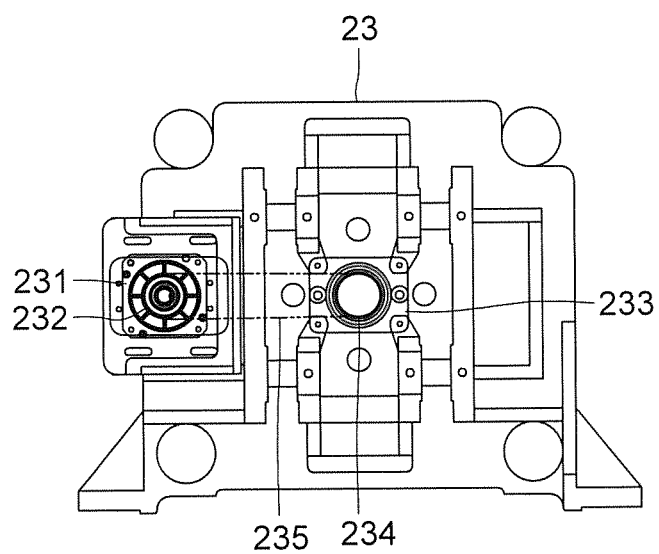
FIG. 4 is a sectional view of Section B-B of the electrical mold clamping apparatus of this disclosure as depicted in FIG. 2.
Figure 5:
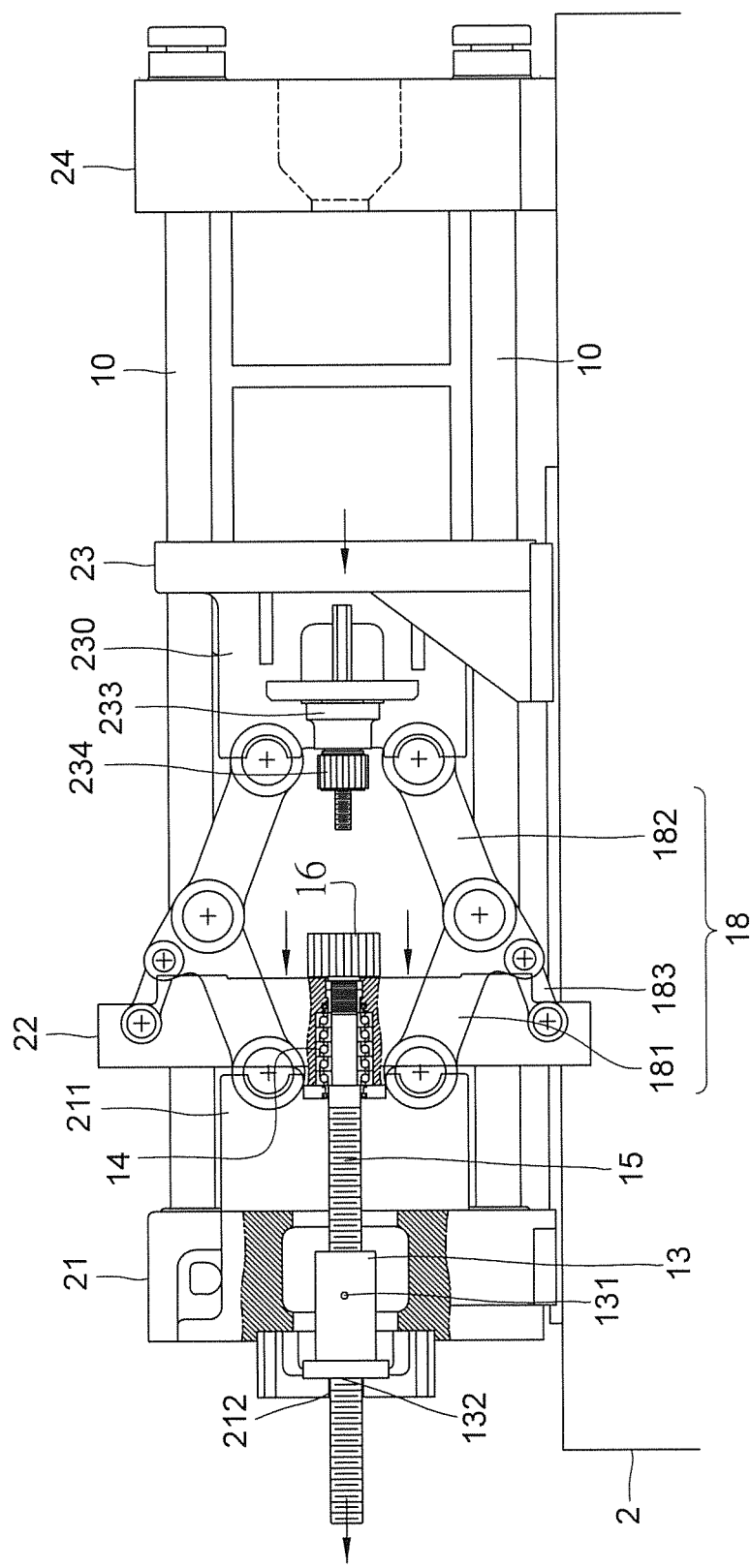
FIG. 5 is a schematic view of an electrical mold clamping apparatus in accordance with a preferred embodiment of this disclosure when a mold is opened (while a movable mold base and a link base are moving)

With reference to FIGS. 2 and 5, during a mold opening process, the first motor unit 11 is turned on to drive the first driving gear 12 to rotate, so that the first driving gear 12 drives the first driven gear 16 to rotate by the first driving belt 17. When the first driven gear 16 is rotated, the ball screw 15 is driven to rotate, and the ball screw 15 is screwed with the ball screw socket 13, and the ball screw 15 is rotated to drive the link base 22 to move towards the fixed base 21, and the third link rod 183 pivoted to the link base 22 drives the first link rod 181, the second link rod 182 and the movable mold base 23 to move towards the fixed base 21.

Figure 6:
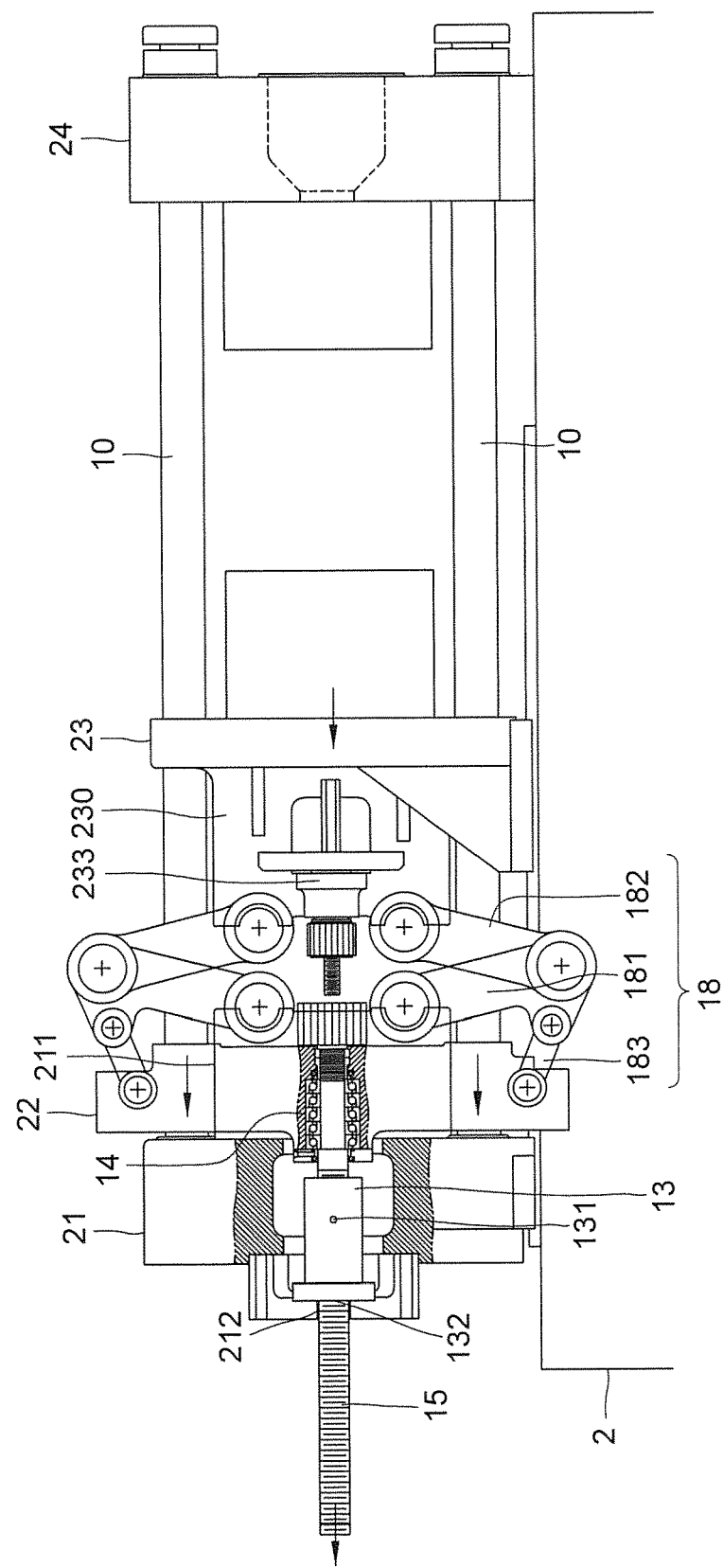
FIG. 6 is a schematic view of an electrical mold clamping apparatus in accordance with a preferred embodiment of this disclosure when a mold is opened (after the movable mold base and link base are moved and positioned).

With reference to FIG. 6, after the mold is opened, the ball screw 15 keeps rotating to link the link rod unit 18, so that the first end of the third link rod 183 and the first end of the first link rod 181 are engaged, and the link base 22 and the fixed base 21 are abutted against each other.

In summation of the description above, the electrical mold clamping apparatus of this disclosure has the following effects:

1. The ball screw socket of the electrical mold clamping apparatus of this disclosure is pivoted to a position of fixed base corresponsive to its through hole, and an end of the ball screw is installed in the ball screw socket, so that when the ball screw is screwed into the ball screw socket, the required lubricating oil is filled through the oil supply hole of the socket, so that an additional oil supply hole is no longer required to form on the ball screw, and the ball screw can achieve the effects of improving the structural strength, extending the service life, and saving the manufacturing cost.

2. The force output end of the ball screw of the electrical mold clamping apparatus of this disclosure is connected to the center of the link base, so that the mold ejector pin can be installed at the center of the movable mold base, so as to overcome the problems of installing the mold ejector pins on both sides, causing unbalanced ejection force exerted onto the molded product, and resulting in a difficult mold separation of the molded product.

3. The ball screw socket of the electrical mold clamping apparatus of this disclosure is pivoted to a position of the fixed base corresponsive to its through hole, and an end of the ball screw is installed into the inner hole of the ball screw socket, so as to overcome the overload problem of the motor when the ball screw is screwed and moved in the ball screw socket.

While this disclosure has been described by means of specific embodiments, numerous modifications and variations could be made thereto by those skilled in the art without departing from the scope and spirit of this disclosure set forth in the claims.

What is claimed is:

1. An electrical mold clamping apparatus of a plastic injection molding machine, the plastic injection molding machine including a plurality of tie bars, and a fixed base, a link base, a movable mold base, and a stationary mold base, said bases being sequentially sleeved on the plurality of tie bars, and a first link rod seat being disposed on an end surface of the fixed base, and a through hole being formed at the center of the fixed base, and a second link rod seat being disposed on an end surface of the movable mold base, the electrical mold clamping apparatus comprising:

a first motor unit installed to a side portion of the link base and coupled to a first driving gear;

a ball screw socket having an inner hole configured to align with the through hole of the fixed base;

a hollow shaft seat disposed at the center of the link base;

a ball screw having a first end screwed into the inner hole of the ball screw socket and a second end passed into the hollow shaft seat;

a first driven gear coupled to the second end of the ball screw, a first driving belt being looped between the first driven gear and the first driving gear; and at least two sets of link rod units, each link rod unit including a first link rod, a second link rod, and a third link rod, and a first end of the first link rod being pivotally coupled to the first link rod seat of the fixed base, and a first end of the second link rod being pivotally coupled to the second link rod seat of the movable mold base, and a second end of the first link rod being pivotally coupled to a second end of the second link rod, and a first end of the third link rod being pivotally coupled to the link base, and a second end of the third link rod being pivotally coupled to a third end of the first link rod.

2. The electrical mold clamping apparatus of a plastic injection molding machine according to claim 1, wherein the ball screw socket has an oil supply hole.

3. The electrical mold clamping apparatus of a plastic injection molding machine according to claim 1, wherein the movable mold base further includes a second motor unit having a second driving gear, an ejector pin having a second driven gear, and a second driving belt looped between the second driving gear and the second driven gear.

4. The electrical mold clamping apparatus of a plastic injection molding machine according to claim 3, wherein the second motor unit is installed to a unilateral portion of an end surface of the movable mold base.

5. The electrical mold clamping apparatus of a plastic injection molding machine according to claim 3, wherein the ejector pin is installed at a center of an end surface of the movable mold base.

6. A plastic injection molding machine comprising:

a plurality of tie bars;

a fixed base, a link base, a movable mold base, and a stationary mold base, said bases being sequentially sleeved on the plurality of tie bars, a through hole being formed at the center of the fixed base;

a first link rod seat disposed on an end surface of the fixed base;

a second link rod seat disposed on an end surface of the movable mold base; and an electrical mold clamping apparatus including:

a first motor unit installed to a side portion of the link base and coupled to a first driving gear, a ball screw socket having an inner hole configured to align with the through hole of the fixed base, a hollow shaft seat disposed at the center of the link base, a ball screw having a first end screwed into the inner hole of the ball screw socket and a second end passed into the hollow shaft seat, a first driven gear coupled to the second end of the ball screw, a first driving belt being looped between the first driven gear and the first driving gear, and at least two sets of link rod units, each link rod unit including a first link rod, a second link rod, and a third link rod, wherein a first end of the first link rod is pivotally coupled to the first link rod seat of the fixed base, a first end of the second link rod is pivotally coupled to the second link rod seat of the movable mold base, a second end of the first link rod is pivotally coupled to a second end of the second link rod, a first end of the third link rod is pivotally coupled to the link base, and a second end of the third link rod is pivotally coupled to a third end of the first link rod.

7. The plastic injection molding machine according to claim 6, wherein the ball screw socket has an oil supply hole.

8. The plastic injection molding machine according to claim 6, wherein the movable mold base further includes a second motor unit having a second driving gear, an ejector pin having a second driven gear, and a second driving belt looped between the second driving gear and the second driven gear.

9. The plastic injection molding machine according to claim 8, wherein the second motor unit is installed to a unilateral portion of an end surface of the movable mold base.

10. The plastic injection molding machine according to claim 8, wherein the ejector pin is installed at a center of an end surface of the movable mold base.

\* \* \* \* \*